UNITED STATES PATENT OFFICE.

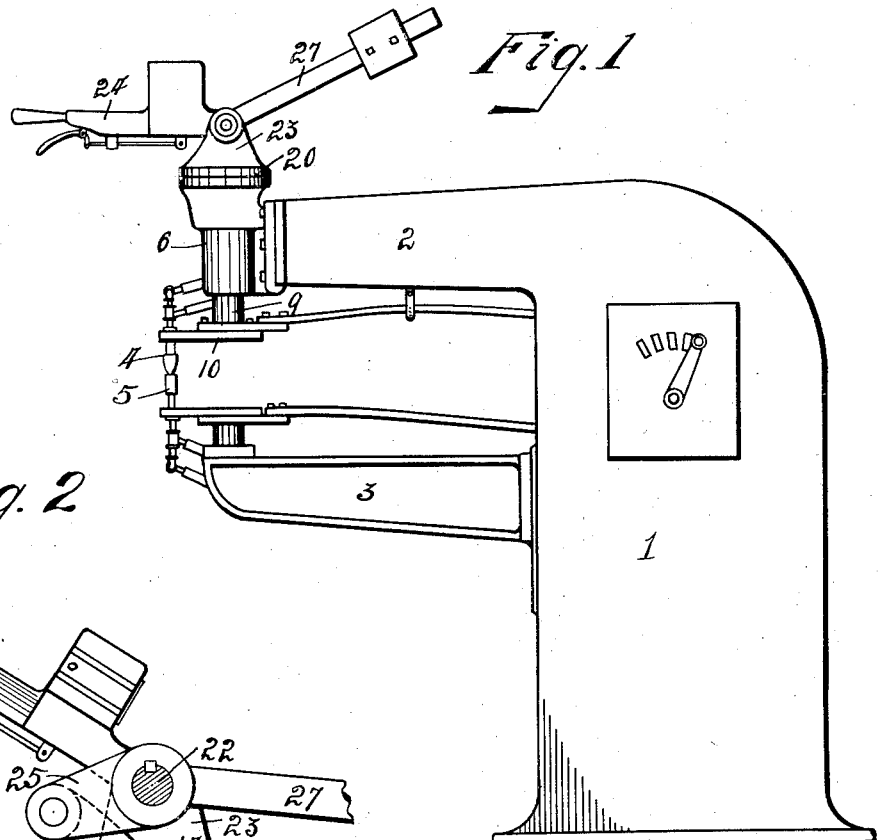
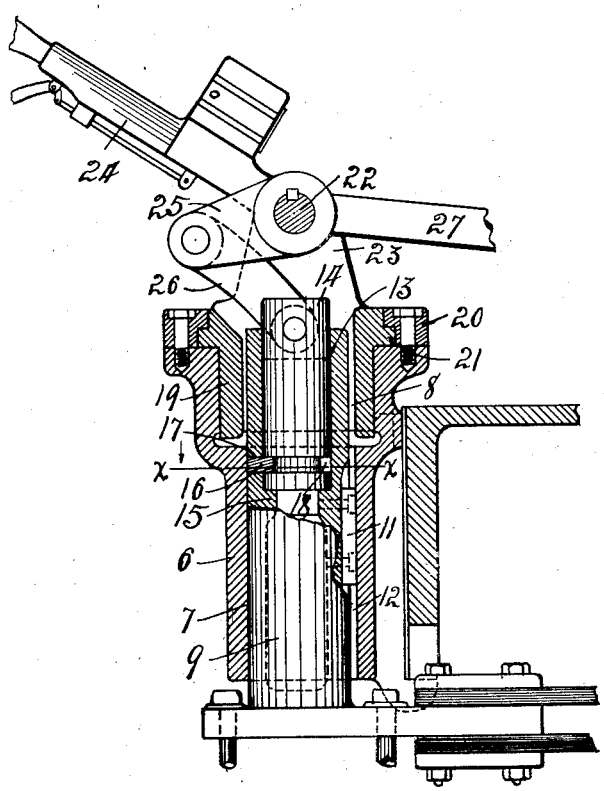

FRANK WARREN, OF CINCINNATI, OHIO, ASSIGNOR TO THE TOLEDO ELECTRIC WELDER COMPANY, OF CINCINNATI, OHIO, A CORPORATION OF OHIO.

ELECTRIC WELDING-MACHINE.

1,046,239.　　　　　Specification of Letters Patent.　　Patented Dec. 3, 1912.

Application filed August 11, 1911. Serial No. 643,484.

*To all whom it may concern:*

Be it known that I, FRANK WARREN, a citizen of the United States, and a resident of Cincinnati, in the county of Hamilton and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to electric welding machines, and has for its object to provide improved simple and efficient means for carrying the die controlling hand-lever for rotary adjustment in a horizontal plane relative to the die or parts actuated thereby, whereby the control lever can be easily and quickly swung to suit the position of the operator relative to the machine.

The invention is fully described in the following specification, and while, in its broader aspect, it is capable of embodiment in numerous forms, a preferred embodiment thereof is illustrated in the accompanying drawings, in which,—

Figure 1 is a side elevation of an electric welding machine embodying the invention. Fig. 2 is an enlarged central vertical section of the swivel lever carrying means embodying my invention, and Fig. 3 is a cross-section on the line *x x* in Fig. 2.

Referring to the drawings, 1 designates the frame of an electric welding machine having the customary upper and lower horns 2 and 3, respectively, projecting from one side thereof, the upper of which, in the present instance, carries the movable welding die or electrode 4 and the associated control mechanism comprising the features of my invention, while the lower one thereof carries the stationary welding die 5 in any suitable manner, as is well understood in the art.

Bolted or otherwise suitably secured to the outer end of the horn 2 is a head 6 having a vertical cylindrical bore 7 therethrough, which is enlarged at its upper end, as at 8. A plunger 9 is disposed within the head 6, being of suitable size for free reciprocatory movements within the bore 7, and has its upper end projecting within the enlarged portion 8 of the bore and its lower end projected below the head and adapted for the attaching of the movable die 4 thereto. While the die 4 may be attached to the plunger 9 in any suitable manner, it is shown in the present instance as being carried by a plate or bar 10, which is screwed to the bottom of the plunger. A key or feather 11 is provided on a side of the plunger for working in a key-way 12 in a wall of the bore 7 to prevent a turning of the plunger within the bore.

The plunger 9 is provided at its upper end with an axial cylindrical socket 13 in which a correspondingly shaped thrust-block 14 is swiveled for free rotary movements. This block rests at its lower end upon the bottom of the socket, or, as in the present instance, upon an internal annular shoulder 15 therein, the socket being extended below the block for the purpose of lightness, and is anchored against withdrawal from the socket by a key 16, which seats within a slot 17 in the side of the plunger 9 and has its inner edge projecting within an annular key-race 18 in the block 14. The key 16 is held to its seat within the slot 17 by the wall of the head bore 7, as shown.

An annular chair or lever carrying bracket 19 is mounted for free rotary movements within the enlarged portion 8 of the head bore around the upper end of the plunger 9, and is rotatably held therein by a retaining collar 20, which is screwed or otherwise suitably secured to the upper end of the head 6 and shoulders over an annular flange 21 of the bracket, which flange rests upon the upper end of the head 6. A shaft 22 is journaled in bearing-lugs 23, which rise from opposite sides of the bracket 19, and keyed thereto is a hand control-lever 24 and a crank-arm 25, the latter being connected to the upper end of the thrust-block 14 by a link 26 to provide a toggle connection between said block and the shaft 22. The lever 24, in the present instance, is normally held with its free end inclined upwardly from its fulcrum by the gravity action thereon of a weighted arm 27 projecting from the shaft 22 as indicated.

It is evident that a lowering of the lever 24 from normal position will cause the toggle members 25 and 26 to act upon the thrust-block 14 to impart a down-stroke to the plunger 9 and vice versa, and that the swiveling of the block 14 and bracket 19 permits a free turning of the control-lever to any desired position of horizontal adjustment relative to the head 6. It is also evident that I have provided a simple form of swivel-head for the movable-die control parts, which is strong and durable in its construction, inexpensive of manufacture, and capable of having the parts thereof easily and quickly assembled or taken apart, thus enhancing the practicability and commercial value of this class of machines.

I wish it understood that my invention is not limited to use in connection with any particular type of machine, or to any specific construction and arrangement of the parts except in so far as such limitations are specified in the claims.

Having thus described my invention, what I claim as new, and desire to secure by Letters Patent, is,—

1. In a machine of the class described, the combination of a plunger, a head in which said plunger is mounted for reciprocal movements, means within the head preventing a relative turning of the head and plunger, a thrust member anchored to an end of said plunger for swivel movements relative thereto, a bracket rotatably carried by the head in concentric relation to said thrust member, a control-lever fulcrumed to the bracket, and toggle connection between the fulcrum end of said lever and said thrust member.

2. In a machine of the class described, the combination of a plunger having a socket in an end thereof, a head having a bore in which said plunger is journaled for reciprocal movements, the bore of said head being enlarged at one end, a thrust member anchored in said plunger socket for rotary movements therein, an annular bracket rotatably mounted in the enlarged end of said bore, a control-lever fulcrumed to said bracket without the associated end of the plunger, and toggle connection between the fulcrum end of said lever and said thrust member.

3. In a machine of the class described, a movable die-carrying plunger having a socket in an end thereof, a head having a bore therethrough in which said plunger is feathered for reciprocal movements, said bore being enlarged at the end thereof opposed to the die carrying end of the plunger, means preventing a rotary movement of the plunger within the head, a thrust-block rotatably mounted within the plunger socket and having a circumferentially extending key race, a key carried by the plunger and working in said race, said key being held in thrust-block anchoring position by the wall of the head bore, an annular member rotatably mounted within the enlarged end of the head bore and encircling the socketed end of said plunger, said member having bearing lugs extending outwardly from opposite sides thereof, means rotatably retaining said member to said head, a shaft journaled in said lugs without said thrust-block, a control-lever keyed to said shaft, and toggle connection between said shaft and thrust-block, substantially as described.

In testimony whereof, I have hereunto signed my name to this specification in the presence of two subscribing witnesses.

FRANK WARREN.

Witnesses:
ALMA LAMMERDING,
E. V. FLEMING.